United States Patent
Preissner et al.

(10) Patent No.: US 9,400,188 B2
(45) Date of Patent: Jul. 26, 2016

(54) ACTIVATING A FUNCTION OF A VEHICLE MULTIMEDIA SYSTEM

(75) Inventors: Olaf Preissner, Stuttgart (DE); Erich Geiger, Kämpfelbach (DE); Peter Rößger, Aichtal (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 2374 days.

(21) Appl. No.: 11/589,324

(22) Filed: Oct. 27, 2006

(65) Prior Publication Data

US 2007/0153130 A1 Jul. 5, 2007

Related U.S. Application Data

(63) Continuation-in-part of application No. PCT/EP2005/004632, filed on Apr. 29, 2005.

(30) Foreign Application Priority Data

Apr. 30, 2004 (EP) ..................................... 04010243

(51) Int. Cl.
*G01C 21/36* (2006.01)
*G06F 3/048* (2013.01)
*G06F 3/0482* (2013.01)
*G06F 3/0484* (2013.01)
*G06F 3/0487* (2013.01)

(52) U.S. Cl.
CPC ........ *G01C 21/3611* (2013.01); *G01C 21/3664* (2013.01); *G06F 3/048* (2013.01); *G06F 3/0482* (2013.01); *G06F 3/0487* (2013.01); *G06F 3/04847* (2013.01)

(58) Field of Classification Search
CPC G01C 21/3664; G01C 21/3611; G06F 3/048; G06F 3/0482; G06F 3/04847; G06F 3/0487
USPC .................. 348/113, 116; 715/700, 744, 745; 345/530
See application file for complete search history.

(56) References Cited

U.S. PATENT DOCUMENTS

| | | | | |
|---|---|---|---|---|
| 5,559,945 A | * | 9/1996 | Beaudet et al. | ................ 715/841 |
| 5,689,668 A | * | 11/1997 | Beaudet et al. | ................ 715/841 |
| 5,784,059 A | * | 7/1998 | Morimoto et al. | ............ 715/854 |
| 5,828,376 A | * | 10/1998 | Solimene | .............. G06F 3/0482 715/821 |
| 5,887,269 A | * | 3/1999 | Brunts et al. | ................... 701/208 |

(Continued)

FOREIGN PATENT DOCUMENTS

| | | |
|---|---|---|
| CN | 1055555 C | 8/2000 |
| CN | 1299222 A | 6/2001 |

(Continued)

*Primary Examiner* — Patrice Winder
*Assistant Examiner* — Angela Widhalm De Rodrig
(74) *Attorney, Agent, or Firm* — Alleman Hall McCoy Russell & Tuttle LLP (57) ABSTRACT

A vehicle multimedia system simplifies a user's interaction with the system. A user may access a specific media unit by actuating a switch corresponding to a media unit. A preference unit detects the user's selection of the media unit and selects an end item based on a programmed criterion. The preference unit may automatically activate the end item. The preference unit may be overridden by the user when a switch corresponding to the selected media unit is actuated multiple times. The preference unit may also manage data lists and data packets that store the information used for the criterion comparison.

21 Claims, 6 Drawing Sheets (56) References Cited

U.S. PATENT DOCUMENTS

| | | | |
|---|---|---|---|
| 6,098,085 A * | 8/2000 | Blonder et al. | 715/208 |
| 6,415,224 B1 | 7/2002 | Wako et al. | |
| 6,484,094 B1 * | 11/2002 | Wako | 701/211 |
| 6,553,309 B2 * | 4/2003 | Uchida et al. | 701/208 |
| 6,600,994 B1 | 7/2003 | Polidi | 701/533 |
| 6,769,320 B1 * | 8/2004 | Bollgohn | B60K 35/00 200/5 R |
| 6,899,539 B1 * | 5/2005 | Stallman | F41H 13/00 345/156 |
| 7,030,845 B2 * | 4/2006 | Maa | H04N 5/4401 345/613 |
| 7,035,720 B2 * | 4/2006 | Taxis | 701/1 |
| 7,218,246 B2 * | 5/2007 | Chiba | 340/990 |
| 7,231,379 B2 * | 6/2007 | Parikh | G06F 17/30011 |
| 7,441,124 B2 * | 10/2008 | Hirasawa | G11B 27/002 380/201 |
| 7,827,508 B2 * | 11/2010 | Venturino | 715/864 |
| 7,861,184 B2 * | 12/2010 | Kim et al. | 715/811 |
| 2001/0002128 A1 * | 5/2001 | Takayama et al. | 345/352 |
| 2001/0012980 A1 * | 8/2001 | Uchida et al. | 701/208 |
| 2002/0038342 A1 * | 3/2002 | Ito | 709/203 |
| 2003/0052924 A1 * | 3/2003 | Carlson | G01R 31/31912 715/810 |
| 2003/0202015 A1 * | 10/2003 | Battles | G06F 3/0482 715/764 |
| 2004/0020704 A1 * | 2/2004 | Sunda et al. | 180/315 |
| 2004/0143372 A1 * | 7/2004 | Taxis | 701/1 |
| 2004/0150674 A1 * | 8/2004 | Takahashi | B60K 35/00 715/810 |
| 2004/0189697 A1 * | 9/2004 | Fukuoka | G06F 9/4443 715/748 |
| 2005/0021470 A1 * | 1/2005 | Martin et al. | 705/51 |

FOREIGN PATENT DOCUMENTS

| | | |
|---|---|---|
| EP | 1 107 544 B1 | 6/2001 |
| EP | 1 122 519 A1 | 8/2001 |
| EP | 1 186 460 A1 | 3/2002 |
| JP | 07-129350 A | 5/1995 |
| JP | 08-147131 A | 6/1996 |
| JP | 2000-149721 A | 5/2000 |

* cited by examiner

ACTIVATING A FUNCTION OF A VEHICLE MULTIMEDIA SYSTEM

PRIORITY CLAIM

This application is a continuation-in-part of co-pending international patent application PCT/EP2005/004632, filed on Apr. 29, 2005 and designating the U.S., which claims the benefit of priority from European Patent Application No. 04010243.6, filed Apr. 30, 2004, both of which are incorporated by reference.

BACKGROUND OF THE INVENTION

1. Technical Field

The invention relates to vehicle multimedia systems, and in particular, to activating a function of a vehicle multimedia system.

2. Related Art

Multimedia systems may have audio, video, and navigation functions. These systems may be mounted into standard dashboard slots in a vehicle. Because space is limited, the system's display size and the number of controls may be restricted.

A multimedia system may include a device that displays a hierarchically structured menu. A user can view and control the menu. A hierarchically structured menu system may include a main menu, sub-menu levels, and end items corresponding to system functions.

Because of the increasing functionality of vehicle multimedia systems, the number of menu levels and end items needed to control the system is increasing. Thus, it is taking more time to access a desired end item, which is creating longer distractions. Therefore, a need exists for a system that allows a user to activate a function of the system quickly that simplifies the user's interaction with the system.

SUMMARY

A vehicle multimedia system includes a controller, media units, a display, and controls. The controls navigate hierarchically structured menus and may be used to select and activate end items. A user accesses a specific media unit by actuating a switch on the system. Instead of displaying a menu, a preference unit detects the switch actuation and selects an end item based on a programmed criterion. The preference unit may activate the end item.

The criterion used by the preference unit may be the end item's frequency of use, the most recently selected end item, or some other criterion. The preference unit may be overridden by the user when the switch corresponding to a specific media unit is actuated multiple times. In that case, the hierarchical menu for that media unit will be displayed. The preference unit may manage data lists and data packets that store the information used for a criterion comparison. The data lists correspond to the media units and contain data packets corresponding to the end items.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A vehicle multimedia system provides quick selection and activation of a function. The system simplifies a user's interaction with the system. The system allows users to spend less time interacting with the system and reduces distractions while driving a vehicle.

The system includes a controller, media units, a display, controls, and a preference unit. A user may actuate a switch on the system to activate a specific media unit (e.g., an audio unit, a video unit, a navigation unit, a telecommunications unit, etc.). When selected, the system displays an end item based on a programmed criterion, such as frequency of use or last end item used. The system may not display sub-level menus and other end items. The user may activate the displayed end item or the system may automatically activate the end item. Alternately, the user may override the system and display a hierarchical menu for the desired media unit by actuating the switch multiple times.

Figure 1:
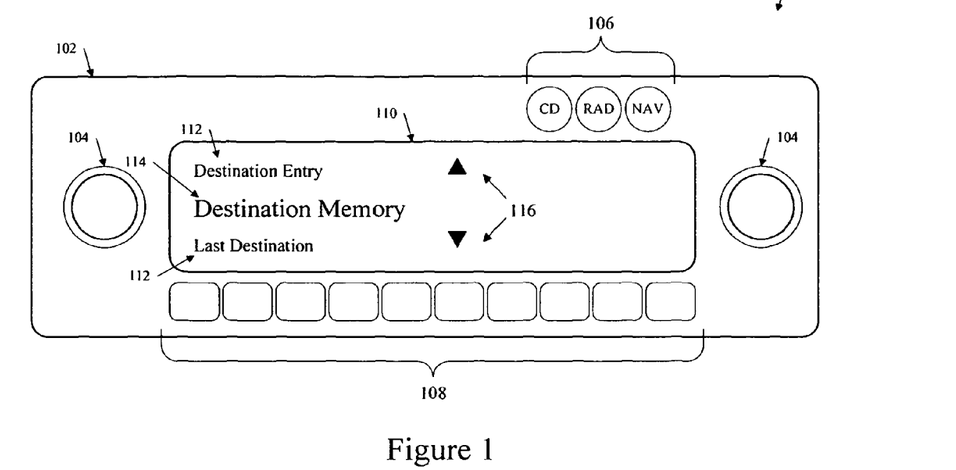
FIG. 1 is a front panel of a vehicle multimedia system.

FIG. 1 is a front panel 102 of a vehicle multimedia system 100. The front panel 102 of the vehicle multimedia system 100 may fit into a dashboard slot in a vehicle. Other components of the system, such as a Global Positioning System and telecommunications devices, may be distributed throughout the vehicle. The components may communicate wirelessly or through a vehicle bus. Some vehicle multimedia systems 100 have extensive capabilities, including audio, video, navigation, telecommunications, and other functions. These functions may correspond to the media units, which may include an audio unit, a video unit, a navigation unit, and a telecommunications unit. The vehicle multimedia system 100 functions may be controlled, selected, and activated by the user through the front panel 102.

The front panel 102 may include selection controls that allow a user to choose multiple states of the system. The controls allow the user to choose one of two or more possible states. In FIG. 1, the controls comprise rotary knobs 104, switches 106, and variable switches 108. The rotary knobs 104 may be rotated to navigate menus and end items and may be pushed to activate menus and end items. The rotary knobs 104 may be used to control other system functions, such as volume. The switches 106 may include switches that activate specific media units of the system. For example, the switch 106 marked "NAV" in FIG. 1 is assigned to and activates the system's navigation unit. The variable switches 108 may be used to select and activate a variety of functions, depending on the state or mode of the system. For example, variable switches may be used in radio mode as radio station presets.

The display 110 may comprise a dot matrix display, a liquid crystal display, an organic electroluminescence display, or other visual output devices. On the display 110, characters, words, pictures, icons, or other visual elements may be shown. In FIG. 1, the display 110 shows three lines of information—two unselected menu items 112 and a selected menu item 114, displayed in a larger font. The display 110 shows arrows 116 that indicate that more menu items are available but are not currently shown. The rotary knobs 104 may be used to scroll through the various menu items and to select a specific menu item, such as selected menu item 114. When the desired menu item is selected, the rotary knob 104 may be pushed to activate that menu item. When a sub-menu is activated, then lower sub-menus or end items may be displayed.

Figure 2:
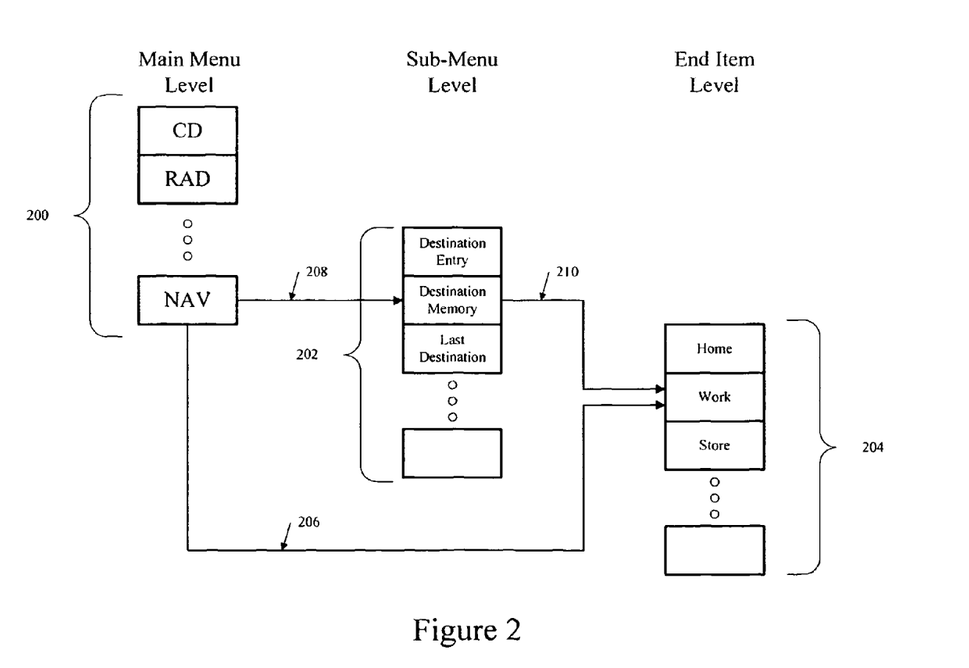
FIG. 2 is a diagram of a hierarchically structured menu of a vehicle multimedia system.

FIG. 2 is a hierarchical menu structure. In FIG. 2, main menus 200 are shown for media units "CD" (compact disc player), "RAD" (radio), and "NAV" (navigation unit). Each main menu 200 may include sub-menu items 202. In turn, each sub-menu item 202 may include end items 204. There may be multiple levels of sub-menus in the hierarchical menu structure. In FIG. 2, sub-menu items 202 "Destination Entry," "Destination Memory," and "Last Destination" are shown for the NAV main menu 200. End items 204 "Home," "Work," and "Store" are shown for the "Destination Memory" sub-menu 202. The end items 204 are saved destinations, and when activated, the navigation system may begin route guidance to the destination.

A user may actuate the switch 106 marked "NAV" to access the navigation unit of the system. In response, the system may select an end item 204 based on a programmed criterion, such as frequency of use or last end item used. In FIG. 2, when the "Work" end item 204 meets the criterion, the system may directly select and display the "Work" end item 204, instead of displaying the sub-menu items 202 (arrow 206). The user may activate the end item 204 by pushing the rotary knob 104, or the system may directly activate the end item 204.

A user may override the system's automatic selection of an end item. An override may occur through multiple (e.g., two, three, or more) actuations of the switch 106. The system may select and display the sub-menu items 202 corresponding to the navigation system (arrow 208). The user may scroll through the various sub-menu items 202 by rotating the rotary knob 104 and selecting and activating the desired sub-menu item 202 by pushing the rotary knob 104. When the user activates the "Destination Memory" sub-menu item 202, then the system may select and display the "Work" end item 204 (arrow 210). The user may activate the "Work" end item 204 by pushing the rotary knob 104. In override mode, the user completes more steps to activate the desired end item 204 (arrows 208 and 210), in contrast to the system automatically selecting, displaying, and possibly activating the end item 204 based on a programmed criterion (arrow 206).

Figure 3:
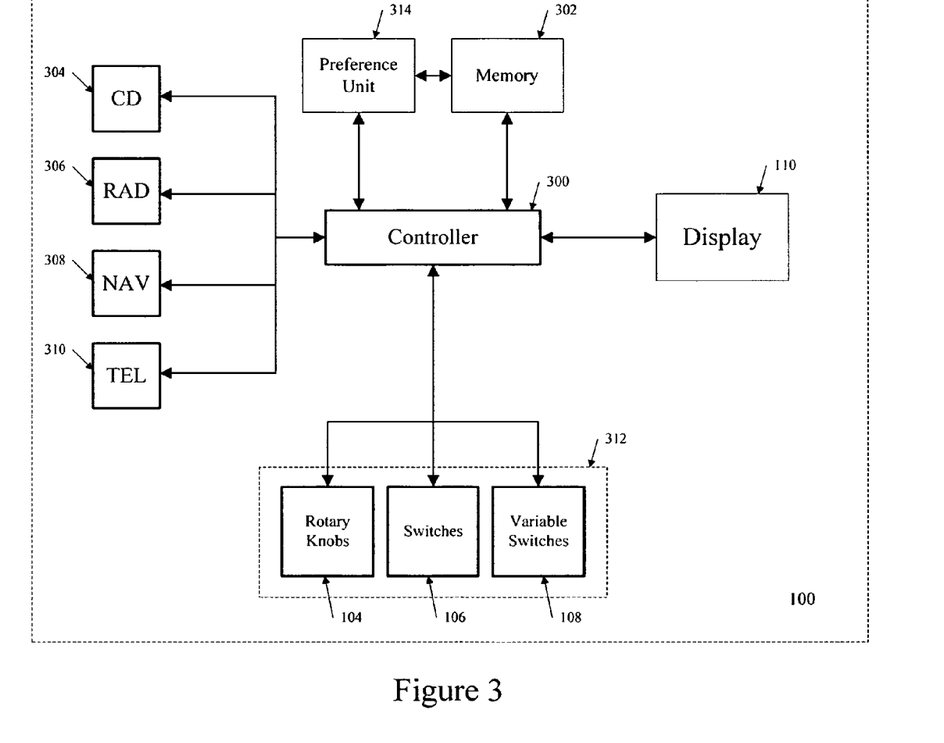
FIG. 3 is a schematic of a vehicle multimedia system.

FIG. 3 is a schematic of a vehicle multimedia system 100. The system 100 may have a controller 300. The controller 300 may communicate with a memory 302. The memory 302 may store information such as destinations, user preferences, temporary data, system firmware, menu information, radio station presets, telephone numbers, or other information. The controller 300 may also communicate with the display 110. The controller 300 may transmit information to the display 110 that may be shown to the user.

The controller 300 may communicate with media units of the vehicle multimedia system 100 wirelessly or through a vehicle bus. In FIG. 3, media units "CD" (compact disc player) 304, "RAD" (radio) 306, "NAV" (navigation unit) 308, and "TEL" (telecommunications unit) 310 are shown. Each media unit may comprise multiple components that communicate with the controller 300. The navigation unit 308 may include a Global Positioning System antenna, receiver, or transmitter. The telecommunications unit 310 may include an antenna and a voice enhancement device. Additional media units may communicate with the controller 300.

The controller 300 may communicate with the selection control unit 312 of the vehicle multimedia system 100. The selection control unit 312 includes rotary knobs 104, switches 106, and variable switches 108. The rotary knobs 104 may be used to scroll through menus, such as main menus 200 and sub-menus 202, and end items 204. The rotary knobs 104 may have multiple functions and may be pushed to select and activate menus and end items. The switches 106 may be assigned to specific system functions, including activating a specific media unit. The variable switches 108 may be used to select and activate a variety of functions, depending on the state or mode of the system. Additional types of selection controls may be programmed within the selection control unit 312.

The preference unit 314 may communicate with the controller 300 and with the memory 302. The preference unit 314 may act with the controller 300 to automatically select, display, and possibly activate an end item 204. Activation may be based on a programmed criterion, in response to an actuation of a switch 106. The preference unit 314 may be implemented as part of wired logic, software, firmware, or other logic. The preference unit 314 may maintain a data structure in the memory 302 for the selection, display, and activation of an end item 204 based on the programmed criterion. The data structure retained in memory 302 and its usage is further detailed in FIGS. 6, 7, 8, and 9.

Figure 4:
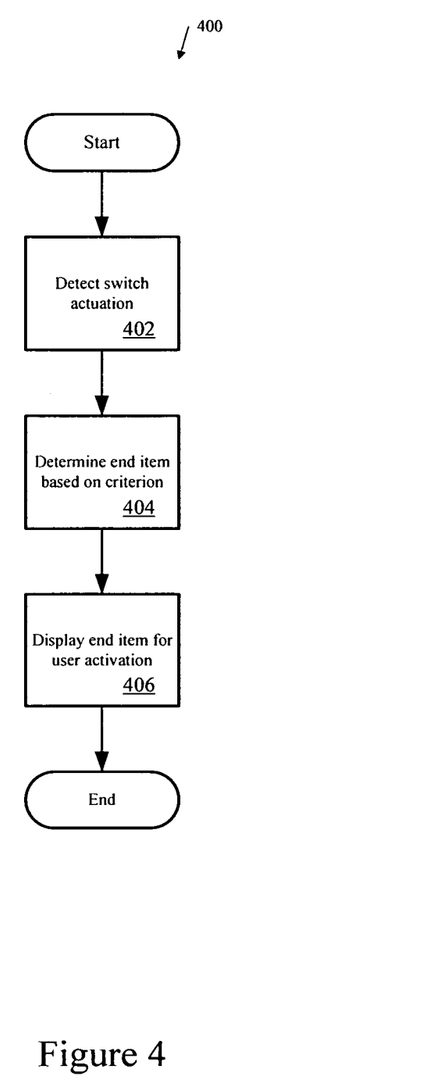
FIG. 4 is a process in which an end item is selected.

FIG. 4 is a process 400 in which an end item 204 is selected based on a programmed criterion in response to an actuation of switch 106. The controller 300 may detect an actuation of switch 106 assigned to a media unit (Act 402). The preference unit 314 may determine the end item 204 to be selected based on a programmed criterion (Act 404). The controller 300 may communicate the selected media unit to the preference unit 314. The criterion used by the preference unit 314 may be the frequency of use of an end item, the last end item used, or other programmed criterion. The preference unit 314 may communicate an end item 204 to the controller 300. The controller 300 may communicate an end item 204 to the display 110 to be shown to a user (Act 406). The display 110 may show the end item 204 as a selected end item 114 in a larger font. The user may manually activate the end item 204, such as by pushing the rotary knob 104.

Figure 5:
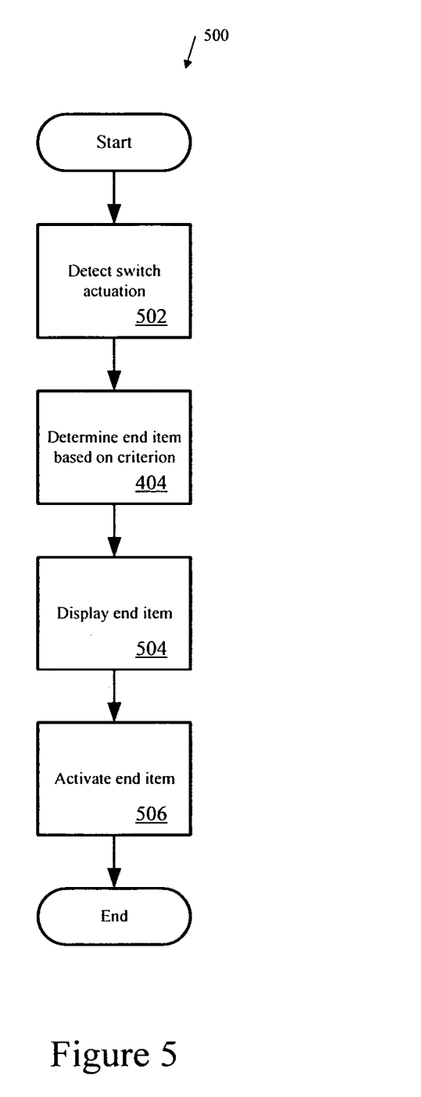
FIG. 5 is a process in which an end item is selected and activated.

FIG. 5 is a process 500 in which an end item 204 is selected and activated based on a programmed criterion in response to an actuation of a switch 106. The controller 300 may detect an actuation of a switch 106 assigned to a media unit (Act 502). The preference unit 314 may determine the end item 204 to be selected and activated based on a programmed criterion (Act 404). The controller 300 may communicate the selected media unit to the preference unit 314. The criterion used by the preference unit 314 may be the frequency of use of an end item, the last end item used, or other programmed criterion. The preference unit 314 may communicate the end item 204 to the controller 300. The controller 300 may communicate the end item 204 to the display 110 to be shown to a user (Act 504). The display 110 may show the end item 204 as a selected end item 114 in a larger font. The controller 300 may activate the end item 204 (Act 506).

Figure 6:
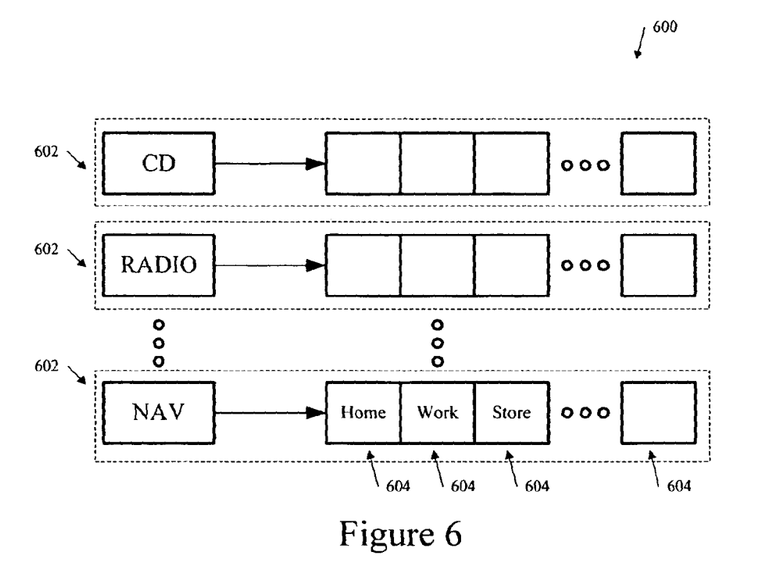
FIG. 6 is a data structure of a vehicle multimedia system.

FIG. 6 is a data structure 600 of a vehicle multimedia system 100. The data structure 600 may be stored in the memory 302. The data structure 600 may be structured with data lists 602 corresponding to media units. The data structure 600 may be implemented as linked lists, binary trees, arrays, stacks, or other structures. In FIG. 6, data lists 602 corresponding to "CD" (compact disc player) 304, "RAD" (radio) 306, and "NAV" (navigation unit) 308 are shown. There may be data lists 602 corresponding to each media unit in the system. The data lists 602 may be structured with data packets 604 that correspond to end items 204 of each media unit. In FIG. 6, data packets 604 corresponding to the "Home," "Work," and "Store" end items 204 are shown. There may be data packets 604 corresponding to the end items that are in each media unit's hierarchically structured menu.

Figure 7:
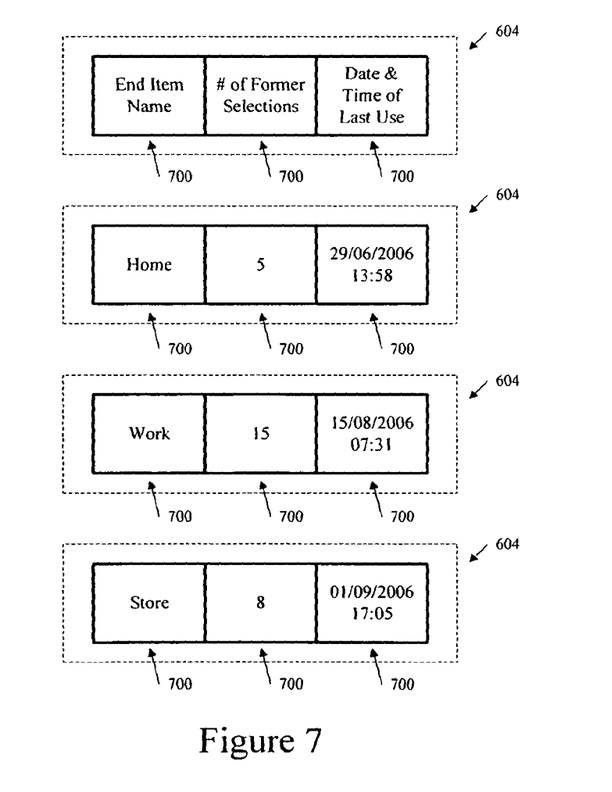
FIG. 7 is data packets of a vehicle multimedia system.

FIG. 7 is data packets 604 of a vehicle multimedia system 100. The data packets 604 may correspond to an end item 204. The data packets 604 may be comprised of sub-packets 700 to store multiple pieces of information corresponding to an end item 204. Sub-packets 700 for the end item name, number of former selections, and date and time of last use are shown. FIG. 7 shows data packets 604 with sub-packets 700 for the "Home," "Work," and "Store" end items 204. As an example, the data packet 604 for the "Home" end item has three sub-packets 700: the first sub-packet 700 is the end item name "Home," the second sub-packet 700 is the number of former selections "5," and the third sub-packet 700 is the date and time of last use "29/06/2006 13:58." There may be sub-packets 700 corresponding to multiple pieces of information for each data packet 604.

Figure 8:
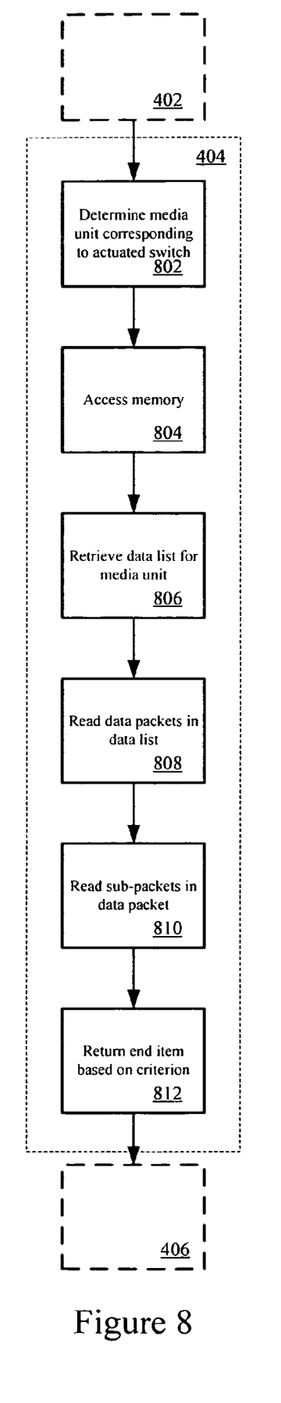
FIG. 8 is a process in which an end item is chosen.

FIG. 8 is a process corresponding to Act 404 of FIGS. 4 and 5, in which an end item 204 may be determined based on a programmed criterion. Before Act 802, the controller 300 may detect an actuation of switch 106 at Act 402. The controller 300 may determine the media unit corresponding to the actuated switch 106 and may communicate the selected media unit to the preference unit 314 (Act 802). The preference unit 314 may access the memory 302 to retrieve information about end items 204 for the selected media unit (Act 804). The preference unit 314 may retrieve the data list 602 corresponding to the selected media unit from the memory 302 (Act 806). For example, when the switch 106 marked "RAD" is actuated, then the data list 602 corresponding to the radio is retrieved. The preference unit 314 may then read the data packets 604 in the retrieved data list 602 for the selected media unit (Act 808). The data packets 604 corresponding to the end items 204 may be read by the preference unit 314.

The sub-packets 700 may be read from the retrieved data packets 604 by the preference unit 314 (Act 810). The sub-packets 700 read by the preference unit 314 may depend on the programmed criterion being used by the preference unit 314. The end item 204 corresponding to the sub-packet 700 meeting the criterion may be returned to the controller 300 (Act 812). For example, when the criterion used by the preference unit 314 is the greatest frequency of use of an end item, then the end item 204 with the greatest number of former selections may be returned to the controller 300. The "Work" end item 204 of FIG. 7 would be returned because it has the greatest number of former selections as recorded in sub-packet 700. Similarly, when the criterion used is the last end item used, then the end item 204 with the most recent date and time of last use may be returned to the controller 300. The "Store" end item 204 of FIG. 7 would be returned because it was the most recently used end item as recorded in sub-packet 700. Following Act 812, the controller 300 may communicate an end item 204 to the display 110 to be shown to users in Act 406.

Figure 9:
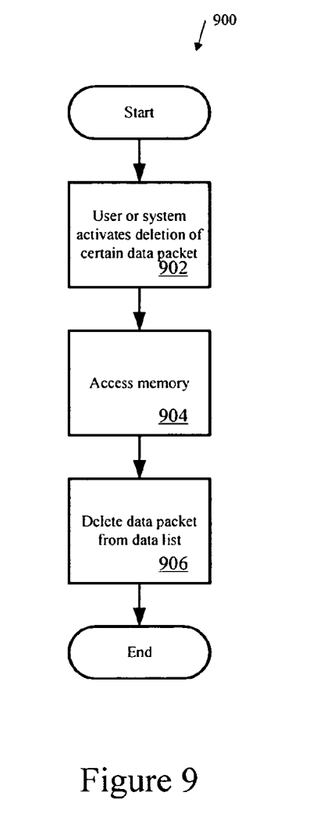
FIG. 9 is a process in which a data packet corresponding to an end item is deleted.

FIG. 9 is a process 900 in which a data packet 604 corresponding to an end item 204 may be deleted. The preference unit 314 or a user may delete a data packet corresponding to an end item 204 (Act 902). The preference unit 314 may delete a data packet 604 when, for example, a certain predetermined time period has elapsed since the last use of an end item 204. Alternately, the user may desire to delete a data packet 604 in order to prevent an end item 204 from being selected by the preference unit 314. The preference unit 314 may access the memory 302, which contains the data lists 602, data packets 604, and sub-packets 700 (Act 904). The preference unit 314 may delete the data packet 604 corresponding to an end item 204 from the data list 602 in memory 302 (Act 906).

Figure 10:
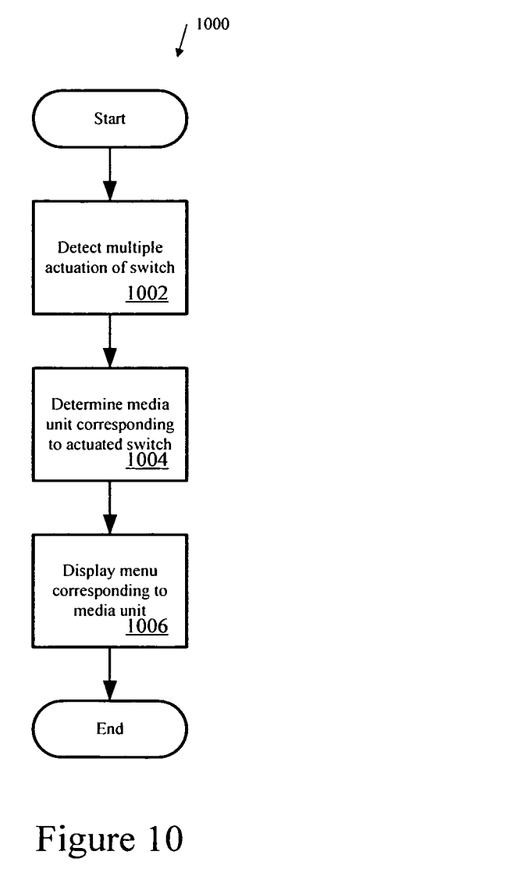
FIG. 10 is a process in which a menu is displayed in response to multiple actuations of a switch.

FIG. 10 is a process 1000 in which menu items 202 may be displayed instead of an end item 204, in response to multiple actuations of switch 106. The process 1000 may be activated by a user to override the preference unit 314. The controller 300 may detect multiple actuations of a switch 106 assigned to a media unit (Act 1002). The controller 300 may determine which media unit has been selected by the user (Act 1004). The controller 300 may display the main menu 202 corresponding to the selected media unit on the display 110 (Act 1006). The user may then scroll through, select, and access menu lists 202, and/or select and activate end items 204.

The processes may be encoded in a computer readable medium such as a memory, programmed within a device such as one or more integrated circuits, one or more processors or may be processed by a controller or a computer. If the processes are performed by software, the software may reside in a memory resident to or interfaced to a storage device, a communication interface, or non-volatile or volatile memory in communication with a transmitter. The memory may include an ordered listing of executable instructions for implementing logical functions. A logical function or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Although selected aspects, features, or components of the implementations are depicted as being stored in memories, all or part of the systems, including processes and/or instructions for performing processes, consistent with the vehicle multimedia system may be stored on, distributed across, or read from other machine-readable media, for example, secondary storage devices such as hard disks, floppy disks, and CD-ROMs; a signal received from a network; or other forms of ROM or RAM, some of which may be written to and read from in a vehicle.

Specific components of a vehicle multimedia system may include additional or different components. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions), databases, and other data structures may be separately stored and managed, may be incorporated into a single memory or database, or may be logically and physically organized in many different ways. Programs and instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A vehicle multimedia system, comprising:
   a controller;
   a plurality of media units in communication with the controller;
   a display device in communication with the controller that displays hierarchically structured menus and end items;
   a plurality of selection controls in communication with the controller that allow a user to choose multiple states of the system, and that select and activate the hierarchically structured menus and end items; and
   a preference unit in communication with the controller, adapted to skip at least one sub-menu level above an end item in a hierarchically structured menu to activate the end item in response to an actuation of a first selection control of the plurality of selection controls, where the preference unit is adapted to select and activate a different end item in response to the actuation of the first selection control when a programmed criterion meets a first condition than when the programmed criterion meets a second condition, where the preference unit is adapted to deactivate the preference unit in response to a further actuation of one of the plurality of selection controls.

2. The system of claim 1, where the programmed criterion comprises one of a frequency of use of the end item or a most recently selected end item.

3. The system of claim 1, where the preference unit is further adapted to allow the user to configure the programmed criterion.

4. The system of claim 1, where the preference unit is adapted to deactivate the preference unit in response to a multiple actuation of the first selection control.

5. The system of claim 1, where the plurality of media units comprises an audio unit, a navigation unit, a video unit, or a telecommunications unit.

6. The system of claim 1, where the plurality of selection controls comprises a plurality of rotary knobs and a plurality of switches.

7. The system of claim 6, where one of the plurality of switches is adapted to select a menu corresponding to one of the plurality of media units.

8. The system of claim 6, where one of the plurality of switches is adapted to select and activate a variable function.

9. The system of claim 1, further comprising a storage medium in communication with the controller that retains at least one data packet corresponding to the end item.

10. The system of claim 9, where the data packet comprises a number of former selections of the end item, or a date and a time of a last selection of the end item.

11. The system of claim 9, where the preference unit is adapted to delete a data packet.

12. A method of selecting a function of a vehicle multimedia system, comprising:
    detecting an actuation of a selection control that is adapted to select a menu corresponding to at least one of a plurality of media units; and
    skipping at least one sub-menu level above an end item of a hierarchically structured menu and corresponding to a function, to activate the end item based on a programmed criterion and in response to the actuation of the selection control, comprising:
    reading a data list corresponding to the media unit;
    reading a first data packet in the data list corresponding to a first end item;
    reading a second data packet in the data list corresponding to a second end item; and
    selecting the first end item or the second end item for activation in response to the actuation of the selection control based on the programmed criterion, information from the first data packet, and information from the second data packet;
    wherein the method further comprises deactivating the skipping of the at least one sub-menu level above the end item in response to a further actuation of at least one of the selection control and a further selection control.

13. The method of claim 12, where the programmed criterion is one of a frequency of use of the end item or a most recently selected end item.

14. The method of claim 12, further comprising:
    detecting a multiple actuation of a selection control that is adapted to select the menu corresponding to at least one of the plurality of media units; and
    displaying the menu.

15. The method of claim 12, where the information from the data packet comprises a number of former selections of the end item or a date and a time of a last selection of the end item.

16. The method of claim 12, further comprising deleting at least one of the data packets.

17. A vehicle multimedia system, comprising:
    a controller;
    a plurality of media units in communication with the controller;
    a display device in communication with the controller that displays hierarchically structured menus and end items;
    means for manually selecting and activating the menus and end items;
    means for automatically selecting and activating an end item of a hierarchically structured menu based on a programmed criterion in response to an actuation of a selection control without displaying at least one sub-menu level above the end item in the hierarchically structured menu, where the means for automatically selecting and activating the end item selects and activates a different end item in response to the actuation of the selection control when the programmed criterion meets a first condition than when the programmed criterion meets a second condition; and means for deactivating the means for automatically selecting and activating the end item in response to a further actuation of at least one of the selection control and a further selection control.

18. The system of claim 1, where the preference unit is adapted to select the end item for display on the display device in response to the actuation of the first selection control without display of the at least one sub-menu level above the end item in the hierarchically structured menu.

19. The system of claim 1, where the preference unit is adapted to select the end item for display on the display device in response to a single actuation of the first selection control, and where the preference unit is adapted to select a menu level above the end item in the hierarchically structured menu for display on the display device in response to a multiple actuation of the first selection control.

20. The system of claim 1, where the controller and the preference unit are adapted to determine whether to display the end item on the display device or instead display a menu level above the end item in the hierarchically structured menu on the display device based on whether a single actuation of the first selection control or a multiple actuation of the first selection control is detected.

21. The method of claim 12, where the step of skipping comprises skipping the at least one sub-menu level in response to detection of a single actuation of the selection control, the method further comprising displaying a menu level above the end item in the hierarchically structured menu on a display device in response to detecting a multiple actuation of the selection control.

* * * * *